March 11, 1958   J. R. FULLERTON ET AL   2,826,676
BRUSH TYPE ELECTRODE FOR RESISTANCE WELDING
Filed March 29, 1956

INVENTORS.
JOHN R. FULLERTON
LAWRENCE E. LEECH
DONALD L. HEYSER
BY
Knox & Knox

United States Patent Office 2,826,676
Patented Mar. 11, 1958

2,826,676
BRUSH TYPE ELECTRODE FOR RESISTANCE WELDING

John R. Fullerton, Lawrence E. Leech, and Donald L. Heyser, San Diego, Calif., assignors to The Ryan Aeronautical Co., San Diego, Calif., a corporation of California Application March 29, 1956, Serial No. 574,682

4 Claims. (Cl. 219—119)

The present invention relates generally to electrical resistance welding and more particularly to a brush type electrode for resistance welding.

The primary object of this invention is to provide a welding electrode comprising a number of thin, flexible electrically conductive bristles or wires secured together in a bundle in the form of a brush.

Another object of this invention is to provide a brush type electrode which may be used to weld extremely thin materials without burning or causing distortion of the material.

Another object of this invention is to provide a brush type electrode which is suitable for use in a welding machine or in a hand held tool.

Another object of this invention is to provide a brush type electrode which is adapted for fabrication from many different materials, so that the choice of material can be according to the dictates of availability and price considerations, the exact sizes and proportions being matters easily determined to suit particular conditions and needs.

Another object of this invention is to provide a brush type electrode which is practicable and inexpensive to manufacture.

Finally, it is an object to provide a brush type electrode of the aforementioned character which is simple, safe and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Similar characters of reference indicate similar or identical elements and portions throughout the specification and throughout the views of the drawing.

Figure 1:
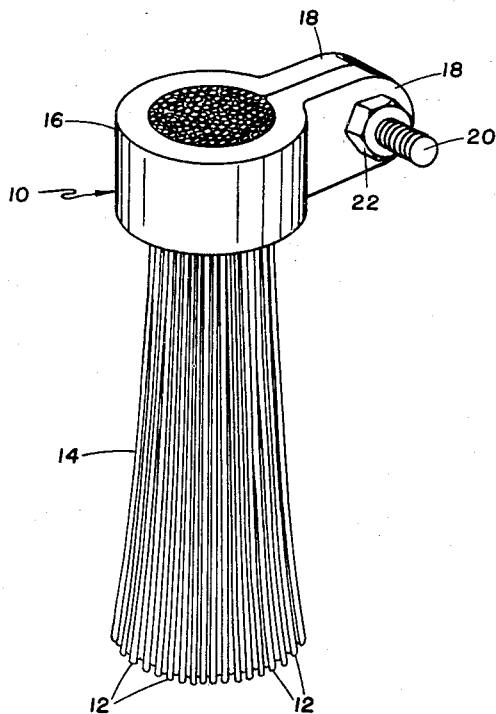
Fig. 1 is a perspective view of the electrode suitable for use in a welding machine.

Referring now to Fig. 1 of the drawing, the electrode 10 comprises a plurality of thin, flexible electrically conductive wires 12 bundled together to form a brush 14. The wires 12 are bound at one end by an electrically conductive clamp collar 16 having extended lugs 18, which are held together by a bolt 20 and nut 22. For additional security the wires 12 may be bound with wire, fused, or otherwise secured into a bundle before being fitted into the clamp collar 16, so that the brush 14 can be easily replaced as a unit when worn. The bolt 20 serves as a terminal by which the electrical connection is made to a suitable resistance welding apparatus. The electrode 10 may be held in the electrode holder of a welding machine in any suitable manner according to the particular machine being used, the collar 16 providing a rigid element by which the electrode can be clamped or otherwise secured.

Figure 2:
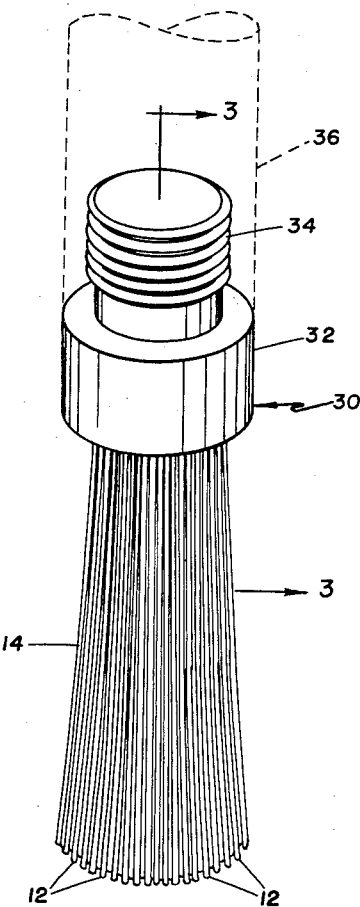
Fig. 2 is a perspective view of the electrode slightly modified for use in a hand tool.
Figure 3:
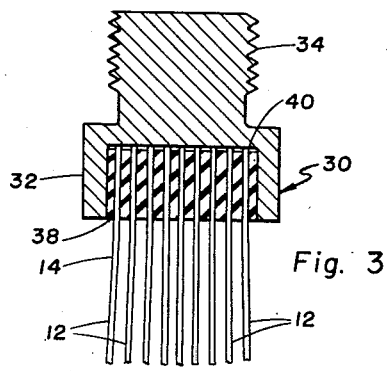
Fig. 3 is a fragmentary sectional view taken on the line 3—3 of Fig. 2.

The device may also be made for use in a hand held welding tool as shown in Fig. 2. This electrode 30 utilizes a brush 14 as previously described, which is secured in a collar 32, said collar having a screw threaded boss 34 extending therefrom. The boss 34 may be screwed into a suitable electrode holder or handle 36, shown in dash line, said boss serving as the electrical connection. The wires 12 are embedded in an insulator block 38 which fits tightly into a socket 40 in the collar 32, the upper ends of said wires being in firm electrical contact with the inside of the socket so that welding current is distributed to all the wires. The wires 12 may also be secured directly in the socket 40 without the block 38 if desired to pack more wires into a given size of brush.

Regardless of whether the electrode is used in a machine or held by hand, the method of use is the same. The brush 14 is applied to the surface of the work piece to be welded and the tips of the wires 12 are drawn across the area of weld, the work piece, of course, being connected to the welding machine also to complete the circuit. The welding current is thus applied at a large number of small area contacts and the actual overall heating of the workpiece is reduced, so that burning and distortion are virtually eliminated. The brush type electrode is especially suitable for welding thin skins or sheets to supporting members as in aircraft structure. Such welding is normally accomplished with rollers or relatively large area electrodes, with the result that the welding operation must be very critically controlled to prevent distortion of the structure. The brush type electrode greatly simplifies the process and improves the quality of the finished work. The brush is most effective when used wtih a welding machine which produces a low voltage, high amperage current in pulses of extremely short duration, such as on the order of 1 to 3 milliseconds. Such short pulses prevent undue burning of the wires 12 and also reduce the possibility of distortion of thin material. However, the use of the brush is not necessarily limited to such apparatus.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

We claim:

1. A brush type electrode for resistance welding, comprising: a plurality of thin, flexible, electrically conductive bristle elements secured together at one end in a bundle and constituting a brush; said brush having a rigid end portion for securement in an electrode holder; and means for operatively connecting said brush to the electrical circuit of a resistance welding machine.

2. A brush type electrode for resistance welding, comprising: a plurality of thin, flexible, electrically conductive bristle elements secured together at one end in a bundle and constituting a brush; and a substantially rigid, electrically conductive collar fixed to the secured end of said brush; said collar comprising means for securing said brush in an electrode holder; and means for operatively connecting said collar to the electrical circuit of a resistance welding machine.

3. A brush type electrode for resistance welding, comprising: an electrically conductive collar having a socket therein; a plurality of flexible, electrically conductive bristle elements fixed in said socket with one end of each of the bristle elements in individual electrical contact with said collar; and said collar having an integral portion for operatively connecting the electrode to a welding machine.

4. A brush type electrode for resistance welding, comprising: an electrically conductive collar having a socket therein; a block fixed in said socket; a plurality of flexible, electrically conductive bristle elements embedded in said block with one end of each of the bristle elements in individual electrical contact with said collar; and a boss integral with and extending from said collar for operatively connecting the electrode to a welding machine.

References Cited in the file of this patent

UNITED STATES PATENTS

| 1,360,307 | Mendenhall et al. | Nov. 30, 1920 |
| 2,365,539 | Flowers | Dec. 10, 1944 |
| 2,631,323 | Seelenbinder | Mar. 17, 1955 |